United States Patent [19]

Hau et al.

[11] 3,939,100

[45] Feb. 17, 1976

[54] COMBINATION ALKALI METAL PYROPHOSPHATE-ALKALINE EARTH METAL PYROPHOSPHATE DETERGENT BUILDER

[75] Inventors: Thomas J. Hau, Cincinnati; Steven D. Cherney, Springdale, both of Ohio

[73] Assignee: The Procter & Gamble Company, Cincinnati, Ohio

[22] Filed: Feb. 14, 1975

[21] Appl. No.: 550,055

[52] U.S. Cl. .................. 252/532; 210/51; 252/116; 252/131; 252/133; 252/140; 252/175; 252/531; 252/538; 252/539
[51] Int. Cl.².... C02B 1/22; C11D 3/04; C11D 3/12; C11D 9/18
[58] Field of Search .......... 252/112, 116, 131, 133, 252/135, 140, 531, 532, 538, 539, 175; 71/36, 51; 423/306; 210/46, 51, 57; 424/57

[56] References Cited
UNITED STATES PATENTS

| | | | |
|---|---|---|---|
| 2,829,110 | 4/1958 | Robson | 252/103 X |
| 2,876,166 | 3/1959 | Nebergall | 424/52 |
| 2,876,168 | 3/1959 | Broge | 424/57 |
| 2,992,186 | 7/1961 | Hellsten | 252/135 |
| 3,001,945 | 9/1961 | Drew | 252/547 X |
| 3,235,505 | 2/1966 | Tuvell | 252/135 |
| 3,393,154 | 7/1968 | Treitler | 252/532 X |
| 3,409,393 | 11/1968 | Stahlheber | 423/306 |
| 3,865,754 | 2/1975 | Norris | 252/532 |
| 3,885,029 | 5/1975 | Norfleet | 424/57 |

FOREIGN PATENTS OR APPLICATIONS

| | | | |
|---|---|---|---|
| 798,856 | 10/1973 | Belgium | 252/131 |

*Primary Examiner*—Dennis L. Albrecht
*Attorney, Agent, or Firm*—R. C. Witte; C. R. Wilson; F. L. Collins

[57] ABSTRACT

Alkali metal pyrophosphates and alkaline earth metal pyrophosphates are combined to provide a builder system for detergent compositions.

9 Claims, No Drawings

COMBINATION ALKALI METAL PYROPHOSPHATE-ALKALINE EARTH METAL PYROPHOSPHATE DETERGENT BUILDER

BACKGROUND OF THE INVENTION

The present invention relates to the use of alkali metal pyrophosphates and alkaline earth metal pyrophosphates which are particularly adapted to reducing water hardness. The alkali metal pyrophosphate and alkaline earth metal pyrophosphate may be used alone as an additive product or formulated into a complete detergent composition. Additive products are intended to supplement the consumer's regular detergent product as a presoak or by direct addition to the wash solution with the consumer's detergent. The detergent composition of the present invention includes an organic detergent as an additional component to the alkali metal pyrophosphate and an alkaline earth metal pyrophosphate.

Builders are important to detergent compositions in that a builder functions to control water hardness. If an ineffective builder or ineffective amounts of a builder are used cleaning performance by the detergent is lessened. The lack of builder capacity is evidenced by measuring the reflectivity of fabrics washed in hard water versus control fabrics washed in the absence of hard water where reflectance is greater.

Detergent builders have for the most part been classified as sequestering or precipitating. Sequestering builders include for example, such materials as water-soluble tripolyphosphate, citrate, ethylene diamine tetraacetate, and organic phosphonates. Alkali metal pyrophosphates are also classed as sequestering builders.

Precipitating builders are materials such as the alkali metal carbonates, bicarbonates, sesquicarbonates, silicates, aluminates, oxylates, and fatty acids, particularly the sodium and potassium salts.

The distinction between precipitating and sequestering builders, is stated to be whether or not a significant amount of precipitate is formed when the builder is used in an amount sufficient to combine with all of the calcium ions in solution. A builder such as sodium tripolyphosphate when used at a level of about 0.06% by weight in a solution containing 7 grains of calcium hardness is not classed as a precipitating builder as no precipitation occurs. As the tripolyphosphate has controlled the hardness, the mechanism is sequestration. Sodium carbonate, however, is classed as a precipitating builder when used at the same concentrations as the sodium tripolyphosphate in a 7 grain solution of calcium ions as the carbonate will eventually precipitate as calcium carbonate, even though the rate of precipitation is slow.

Precipitating builders such as sodium carbonate which exhibit extremely slow rates of precipitation with calcium ions are frequently insufficient to prevent intereference by the calcium ion with the detergent thereby impairing the cleaning of the fabrics. This intereference takes place primarily at the site of body soil stains where the calcium ions become affixed to the carboxyl radicals in the fatty acids of the body soil. Another way in which the calcium ions interfere with the detergency process is that they combine with the detergent component to lessen the detergents effective concentration. For instance, alkyl benzene sulfonates are anionic detergents which may be precipitated by calcium ions to the extent that on a stoichiometric basis one mole of calcium ion solution will precipitate 2 moles of alkyl benzene sulfonate, thus substantially lowering the amount of detergent active available for cleaning.

As was previously mentioned the sodium carbonate would if given sufficient amount of time precipitate most of the calcium ions. During the course of a wash cycle which is generally from 10 to 12 minutes, the calcium ions do not precipitate but predominantly associate as a soluble species in a 1:1 ion pair with the carbonate anion. This soluble calcium complex has a binding constant much less than that found in the calcium tripolyphosphate sequestered complex. To improve the effectiveness of sodium carbonate as a detergent builder it has been suggested in Belgium Pat. No. 798,856 issued Oct. 29, 1973, herein incorporated by reference, that a crystallization seed such as calcium carbonate be included in the composition. The use of the crystallization seed provides a two-fold benefit. First, the calcium ions in the wash solution are rapidly depleted by the precipitation of the calcium and carbonate ions onto the surface of the crystallization seed, and second, that once precipitated upon the crystallization seed the calcium ions are no longer free to interfere with the organic detergent components.

It was previously stated that the alkali metal pyrophosphates with which the present invention is concerned, are classed as sequestering builders. Sodium pyrophosphate is the equivalent of sodium tripolyphosphate in that both possess the ability to sequester one mole of calcium hardness per mole of the respective polyphosphate anion. This sequestration by pyrophosphate is extremely rapid and permanent in that the calcium ions once sequestered do not to any appreciable extent become free again. Indeed sodium pyrophosphate in a composition of limited phosphorus content is more advantageous to use than tripolyphosphate because the molecular weight of the pyrophosphate is lower than that of the tripolyphosphate thus allowing more moles of pyrophosphate anion to be present than of the tripolyphosphate anion at a given phosphorus content.

It has now been found that alkali metal pyrophosphates are made much more effective in their building capacity when used in conjunction with finely divided particles of calcium pyrophosphate. It was previously stated that the alkali metal pyrophosphates were previously known for their use in detergent product as sequestrants of water hardness. While not wishing to be bound by any particular theory it appears that the calcium pyrophosphate causes the alkali metal pyrophosphates to precipitate rather than only sequester calcium ions in the wash. Some of the effect of the calcium pyrophosphate alone may be to assist in increasing the reflectivity of the washed fabric.

Whereas sodium pyrophosphate sequesters calcium ions on a 1:1 molar basis, it will precipitate as the dicalcium salt on the finely divided calcium pyrophosphate in a ratio of 2 moles of calcium ion per mole of soluble pyrophosphate. Thus substantially larger amounts of calcium ion can be controlled by precipitation than by sequestration.

It is thus an object of the present invention to prepare a detergent additive or complete detergent composition containing an alkali metal pyrophosphate as a detergent builder.

It is yet a further object of the present invention to prepare a detergent composition or detergent additive containing calcium pyrophosphate.

Yet a further object of the present invention is to prepare a detergent additive or complete detergent product containing as a builder system an alkali metal pyrophosphate which is of an increased effectiveness in depleting water hardness and maintaining whiteness through the use of calcium pyrophosphate.

Percentages and ratios throughout the specification and claims are by weight unless otherwise indicated. Temperatures are by degrees Fahrenheit unless noted otherwise.

SUMMARY OF THE INVENTION

The present invention has two aspects. The first is a detergent additive comprising:
  a. an alkali metal pyrophosphate; and
  b. an alkaline earth metal pyrophosphate having a mean particle diameter of less than 25 microns; in a weight ratio of the alkali metal pyrophosphate to the alkaline earth metal pyrophosphate of from about 60:1 to about 1:8.

A second aspect of the present invention is a detergent composition comprising:
  a. from about 5% to about 60% by weight of an alkali metal pyrophosphate;
  b. from about 1% to about 50% by weight of an alkaline earth metal pyrophosphate having a mean particle diameter of less than 25 microns; and
  c. from about 2% to about 40% by weight of an organic detergent component.

DETAILED DESCRIPTION OF THE INVENTION

The alkali metal pyrophosphates of the present invention are commercially available from several sources. Preferably the alkali metal pyrophosphates of the present invention are the sodium and potassium salts, especially sodium. The choice of the physical form of the alkali metal pyrophosphate to be employed herein is not particularly important, however, some advantages may be noted for one form over another. Thus the anhydrous salts or hydrates of the alkali metal pyrophosphates are employed herein. When the composition is in granular form it is preferred that the granules be of the size of granules in commercially available detergents to ensure rapid dissolution and for consumer aesthetics. While the anhydrous pyrophosphates may be used in the present invention there is no particular advantage because in several modes of the present invention the pyrophosphate will be contacted with an aqueous slurry.

The alkaline earth metal pyrophosphates of the invention such as the calcium or magnesium salts thereof, particularly calcium, are employed in the present invention as a crystallization seed upon which water hardness ions associated with the alkali metal pyrophosphates precipitate. It is believed that to provide for the most effective use of the crystallization seed, that the calcium pyrophosphate particles should have a large surface area available for crystal growth and that the crystallization seeds themselves be present in a sufficiently large number to ensure that they are dispersed throughout the solution containing the water hardness.

The rate at which the hardness may be depleted by precipitation at a given alkali metal pyrophosphate content is a function of the number of particles of the alkaline earth metal pyrophosphate present in the solution containing hardness. With greater numbers of crystallization seeds present in the solution, there is a greater probability that the water hardness to be precipitated will come in contact with the crystallization seed. The surface area of the alkaline earth metal pyrophosphate available for crystallization growth is also a function of the number of particles present per given weight of the alkaline earth metal pyrophosphate. Thus for a given crystal structure of the alkaline earth metal pyrophosphate the mean particle diameter defined as the longest axis of the particle, will be determinative of the nominal surface area. Otherwise stated the known geometry of the particle and mean diameter thereof allow the calculation of the nominal surface area.

In discussing the surface area, it is assumed that the crystallization seed has not been deactivated or poisoned by a material which would inhibit the growth on the crystal surface of the reaction product of the water hardness salt and the pyrophosphate anion.

Herein particle size is used as a convenient measure of the surface area of the alkaline earth metal pyrophosphate.

To be effective as a crystallization seed the alkaline earth metal pyrophosphate has a mean particle diameter of less than 25 microns, preferably from about 0.01 to about 1.0 micron, and most preferably from about 0.01 to about 0.20 micron. The surface area of the alkaline earth metal pyrophosphate crystallization seed should be greater than 1 square meter per gram, preferably greater than 20 square meters per gram, and most preferably greater than 100 square meters per gram.

Alkaline earth metal pyrophosphates useful in the present invention may be prepared in accordance with the methods described in U.S. Pat. No. 2,876,166 to Nebergall on Mar. 3, 1959, and U.S. Pat. No. 2,876,168 to Broge et al, patented Mar. 3, 1959.

Briefly summarized the alkaline earth metal pyrophosphates, and in particular calcium pyrophosphate, may be prepared by heating dicalcium orthophosphate dihydrate to a temperature from about 100°C to about 300°C to drive off the water of hydration thus forming anhydrous dicalcium orthophosphate. The anhydrous dicalcium orthophosphate is then heated to a temperature above about 300°C to drive off the water of constitution resulting in the formation of calcium pyrophosphate ($Ca_2P_2O_7$). The alkaline earth metal pyrophosphates if not of the requisite size and surface area may be made finer by colloid mills which are used to grind the alkaline earth metal pyrophosphate to the desired particle size.

In the detergent additive aspect of the present invention the weight ratio of the alkali metal pyrophosphate to the alkaline earth metal pyrophosphate is from about 60:1 to about 1:8, preferably from about 20:1 to about 1:1, and most preferably from about 10:1 to about 2:1. While the amount of alkali metal pyrophosphate used to precipitate hardness is theoretically set at one-half the amount necessary for sequestration, slightly larger amounts are desirable so that some soluble pyrophosphate is available in the wash to peptize and suspend soil.

To either the additive composition or the complete detergent product of the present invention supplemental alkaline materials may be included to provide a reserve source of alkalinity to keep the pH of the solution from which the hardness is to be depleted above 8, preferably above 9. The purpose of the supplemental alkaline materials is to provide a pH where the precipitation product of the water hardness and the alkali metal pyrophosphate is most favorable. Preferably the supplemental alkaline material is an alkali metal carbonate or an alkali metal or alkaline earth metal hydroxide and mixtures thereof. Alkali metal silicates of the formula $SiO_2:M_2O$ may also be employed to provide the benefit of the supplemental alkaline material. The alkali metal silicates generally have an $SiO_2:M_2O$ weight ratio of from about 1:1 to about 4:1. Preferably the alkali metal silicate is the sodium or potassium, especially the sodium salt thereof. Examples of the alkali metal carbonates are sodium and potassium carbonate, while the alkali metal hydroxides are preferably sodium or potassium and the alkaline earth metal hydroxide is preferably calcium hydroxide. These alkaline materials are employed at a level of from about 1% to about 30%, preferably about 3% to about 20% by weight.

When the product of the present invention is formulated as a complete detergent composition the alkali metal pyrophosphate will be present in the composition at from about 5 to about 60%, preferably about 8 to about 40%, and most preferably from about 12% to about 27% by weight of the composition.

The amount of the alkaline earth metal pyrophosphate in the detergent product is from about 1 to about 50%, preferably from about 2 to about 30%, and most preferably from about 3% to about 20% by weight of the composition. The preferred ratios of the alkali metal pyrophosphate to the alkaline earth metal pyrophosphate are as previously given for the detergent additive.

The organic detergent component of the present invention as more fully described below is present at from about 2 to about 40%, preferably from about 5 to about 30%, and most preferably from about 10 to about 25% by weight of the total detergent composition.

The supplemental alkaline material discussed above were used in conjunction with the detergent additive aspect of the present invention may also be used with the detergent composition of the present invention. Suitable organic detergent components which may be used herein include, for example, the following:

DETERGENT COMPONENT

Preferably the detergent component of the present invention is a water-soluble salt of: an ethoxylated sulfated alcohol with an average degree of ethoxylation of about 1 to 4 and an alkyl chain length of about 14 to 16; tallow ethoxy sulfate; tallow alcohol sulfates; an alkyl benzene sulfonate with an average alkyl chain length between 11 and 12, preferably 11.2 carbon atoms; a $C_6–C_{20}$ $\alpha$-sulfocarboxylic acid or ester thereof having 1 to 14 carbon atoms in the alcohol radical; a $C_8–C_{24}$ paraffin sulfonate; a $C_{10}–C_{24}$ $\alpha$-olefin sulfonate or mixtures thereof; or other anionic sulfur-containing surfactant. Such preferred detergents are discussed below.

An especially preferred alkyl ether sulfate detergent component of the present invention is a mixture of alkyl ether sulfates, said mixture having an average (arithmetic mean) carbon chain length within the range of about 12 to 16 carbon atoms, preferably from about 14 to 15 carbon atoms, and an average (arithmetic mean) degree of ethoxylation of from about 1 to 4 moles of ethylene oxide, preferably from about 2 to 3 moles of ethylene oxide.

Specifically, such preferred mixtures comprise from about 0 to 10% by weight of mixture of $C_{12-13}$ compounds, from about 50 to 100% by weight of mixture of $C_{14-15}$ compounds, and from about 0 to 45% by weight of mixture of $C_{16-17}$ compounds, and from about 0 to 10% by weight of a mixture of $C_{18-19}$ compounds. Further, such preferred alkyl ether sulfate mixtures comprise from about 0 to 30% by weight of mixture of compounds having a degree of ethoxylation of 0, from about 45 to 95% by weight of mixture of compounds having a degree of ethoxylation from 1 to 4, from about 5 to 25% by weight of mixture of compounds having a degree of ethoxylation from 5 to 8, and from about 0 to 15% by weight of mixture of compounds having a degree of ethoxylation greater than 8. The sulfated condensation products of ethoxylated alcohols of 8 to 24 alkyl carbons and with from 1 to 30, preferably 1 to 4 moles of ethylene oxide may be used in place of the preferred alkyl ether sulfates discussed above.

Another class of detergents which may be used in the present invention includes the water-soluble salts, particularly the alkali metal, ammonium, and alkylolammonium salts of organic sulfuric reaction products having in their molecular structure an alkyl group containing from about 8 to about 22 carbon atoms and a sulfuric acid ester group. Examples of this group of synthetic detergents are the sodium and potassium alkyl sulfates, especially those obtained by sulfating the higher alcohols ($C_8–C_{18}$ carbon atoms) produced by reducing the glycerides of tallow or coconut oil.

Preferred water-soluble organic detergent compounds herin include alkyl benzene sulfonates (preferably linear although "hard" ABS may be used) containing from about 9 to 15 carbon atoms in the alkyl group. Examples of the above are sodium and potassium alkyl benzene sulfonates in which the alkyl group contains from about 11 to about 12 carbon atoms, in straight chain or branched chain configuration, e.g. those of the type described in U.S. Pat. Nos. 2,220,099 and 2,477,383. Especially valuable are straight chain alkyl benzene sulfonates in which the average of the alkyl groups is about 11.2 carbon atoms, abbreviated as $C_{11.2}$ LAS.

Another useful detergent compound herein includes the water-soluble salts of esters of $\alpha$-sulfonated fatty acids containing from about 6 to 20 carbon atoms in the fatty acid group and their esters from about 1 to 14 carbon atoms in the alcohol radical.

Preferred "olefin sulfonate" detergent mixtures utilizable yerein comprise olefin sulfonates containing from about 10 to about 24 carbon atoms. Such materials can be produced by sulfonation of $\alpha$-olefins by means of uncomplexed sulfur trioxide followed by neutralization under conditions such that any sultones present are hydrolyzed to the corresponding hydroxyalkane sulfonates. The $\alpha$-olefin starting materials preferably have from 14 to 16 carbon atoms. Said preferred $\alpha$-olefin sulfonates are described in U.S. Pat. No. 3,332,880, incorporated herein by reference.

The paraffin sulfonates embraced in the present invention are essentially linear and contain from 8 to 24 carbon atoms, preferably 12 to 20 and more preferably 14 to 18 carbon atoms in the alkyl radical.

Other anionic detergent compounds herein include the sodium alkyl glyceryl ether sulfates, especially those ethers of higher alcohols derived from tallow and coconut oil; sodium coconut oil fatty acid monoglyceride sulfonates and sulfates; and sodium or potassium salts of alkyl phenol ethylene oxide ether sulfate containing about 1 to about 10 units of ethylene oxide per molecule and wherein the alkyl groups contain about 8 to about 12 carbon atoms.

Water-soluble salts of the higher fatty acids, i.e. "soaps," are useful as the detergent component of the composition herein. This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Soaps can be made by direct saponification of fats and oils or by the neutralization of free fatty acids. Particularly useful are the sodium and potassium salts of the mixtures of fatty acids derived from coconut oil and tallow, i.e. sodium or potassium tallow and coconut soap.

Water-soluble nonionic synthetic detergents are also useful as the detergent component of the instant composition. Such nonionic detergent materials can be broadly defined as compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

For example, a well-known class of nonionic synthetic detergents is made available on the market under the trade name "Pluronic" sold by Wyandotte Chemicals. These compounds are formed by condensing ethylene oxide with a hydrophobic base formed by the condensation of propylene oxide with propylene glycol. Other suitable nonionic synthetic detergents include the polyethylene oxide condensates of alkyl phenols, e.g. the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol.

The water-soluble condensation products of aliphatic alcohols having from 8 to 22 carbon atoms, in either straight chain or branched configuration, with ethylene oxide, e.g. a coconut alcohol-ethylene oxide condensate having from 5 to 30 moles of ethylene oxide per mole of coconut alcohol, the coconut alcohol fraction having from 10 to 14 carbon atoms, are also useful nonionic detergents herein.

Semi-polar nonionic detergents include watersoluble amine oxides containing one alkyl moiety of from about 10 to 28 carbon atoms and 2 moieties selected from the group consisting of alkyl groups and hydroxyalkyl groups containing from 1 to about 3 carbon atoms; water-soluble phosphine oxide detergents containing one alkyl moiety of about 10 to 28 carbon atoms and 2 moieties selected from the group consisting of alkyl groups and hydroxyalkyl groups containing from about 1 to 3 carbon atoms; and water-soluble sulfoxide detergents containing one alkyl moiety of from about 10 to 28 carbon atoms and a moiety selected from the group consisting of alkyl and hydroxyalkyl moieties of from 1 to 3 carbon atoms.

Ampholytic detergents include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic detergents include derivatives of aliphatic quaternary ammonium, phosphonium and sulfonium compounds in which the aliphatic moieties can be straight chain or branched, and wherein one of the aliphatic substituents contains from about 8 to 18 carbon atoms and one contains an anionic water-solubilizing group.

Other useful detergents include water-soluble salts of 2-acyloxy-alkane-1-sulfonic acids containing from about 2 to 9 carbon atoms in the acyl group of from about 9 to about 23 carbon atoms in the alkane moiety; β-alkyloxy alkane sulfonates containing from about 1 to 3 carbon atoms in the alkyl group and from about 8 to 20 carbon atoms in the alkane moiety; alkyl dimethyl amine oxides wherein the alkyl group contains from about 11 to 16 carbon atoms; alkyldimethyl-ammonio-propane-sulfonates and alkyl-dimethyl-ammonio-hydroxypropane-sulfonates wherein the alkyl group in both types contains from about 14 to 18 carbon atoms; soaps as hereinabove defined; the condensation product of tallow fatty alcohol with about 11 moles of ethylene oxide; the condensation product of a $C_{13}$ (avg.) secondary alcohol with 9 moles of ethylene oxide; and alkyl glyceral ether sulfates with from 10 to 18 carbon atoms in the alkyl radical.

A typical listing of the classes and species of detergent compounds useful herein appear in U.S. Pat. No. 3,852,211, to Ohren issued Dec. 3, 1974, incorporated herein by reference. The foregoing list of detergent compounds and mixtures which can be used in the instant compositions is representative of such materials, but is not intended to be limiting.

ADDITIONAL COMPONENTS

It is to be understood that the compositions of the present invention may be supplemented by all manner of detergent components. Soil suspending agents may be included at about 0.5% to 10% by weight such as water-soluble salts of carboxymethylcellulose, carboxyhydroxymethylcellulose, copolymers of maleic anhydride and vinyl ethers, and polyethylene glycols having a molecular weight of about 400 to 10,000 are common components of the detergent compositions of the present invention. Dyes, pigments, optical brighteners, and perfumes can be added in varying amounts as desired.

Other materials such as fluorescers, antiseptics, germicides, enzymes in minor amounts of anti-caking agents such as sodium sulfosuccinate, and sodium benzoate may also be added.

Additional amounts of water-soluble detergency builders may be added to the detergent compositions of the present invention. Such inorganic detergency builder salts include alkali metal carbonates, borates, and bicarbonates. Specific examples of such salts are the sodium and potassium borates, perborates, bicarbonates, and carbonates. The alkali metal carbonates are used as co-builders in the same amounts as they are for a supplemental source of alkalinity as discussed previously.

Examples of suitable organic detergency builder salts are: (1) water-soluble aminopolycarboxylates, e.g. sodium and potassium ethylenediaminetetraacetates, nitrilotriacetates and N-(2-hydroxyethyl)-nitrilodiacetates; (2) water-soluble salts of phytic acid, e.g. sodium and potassium phytates — see U.S. Pat. No. 2,739,942; (3) water-soluble polyphosphonates, including specifically, sodium, potassium and lithium salts of ethane-1-hydroxy-1,1diphosphonic acid, sodium, potassium and lithium salts of methylene diphosphonic acid, sodium, potassium and lithium salts of ethylene diphosphonic acid, and sodium, potassium and lithium salts of ethane-1,1,2-triphosphonic acid. Other examples include the alkali metal salts of ethane-2-carboxy-1,1-diphosphonic acid, hydroxymethanediphosphonic acid, carbonyldiphosphonic acid, ethane-1-hydroxy-1,1,2triphosphonic acid, ethane-2-hydroxy-1,1,2-triphosphonic acid, propane-1,1,3,3-tetraphosphonic acid, propane-1,1,2,3-tetraphosphonic acid, and propane-1,2,2,3-tetraphosphonic acid; and (4) water-soluble salts of polycarboxylate polymers and copolymers as described in U.S. Pat. No. 3,308,067.

A useful detergent builder which may be employed in the present invention comprises a water-soluble salt of a polymeric aliphatic polycarboxylic acid having the following structural relationships as to the position of the carboxylate groups and possessing the following prescribed physical characteristics: (a) a minimum molecular weight of about 350 calculated as to the acid form; (b) an equivalent weight of about 50 to about 80 calculated as to acid form; (c) at least 45 mole percent of the monomeric species having at least two carboxyl radicals separated from each other by not more than two carbon atoms; (d) the site of attachment of the polymer chain of any carboxyl-containing radical being separated by not more than three carbon atoms along the polymer chain from the site of attachment of the next carboxyl-containing radical. Specific examples of the above-described builders include polymers of itaconic acid, aconitic acid, maleic acid, mesaconic acid, fumaric acid, methylene malonic acid and citraconic acid and copolymers with themselves.

In addition, other builders which can be used satisfactorily include water-soluble salts of mellitic acid, citric acid, pyromellitic acid, benzene pentacarboxylic acid, oxydiacetic acid, carboxymethyloxysuccinic acid, and oxydisuccinic acid.

The detergent compositions of this invention preferably contain the water-soluble detergent in a ratio to the total builder present in a weight ratio of from about 10:1 to about 1:10, preferably from about 2:1 to about 1:5. The amount of additional builder in either the additive or detergent compositions of the present invention is from about 2% to about 30%, preferably from about 5% to about 20%.

Certain zeolites or aluminosilicates enhance the function of the alkaline metal pyrophosphate and add building capacity in that the aluminosilicates sequester calcium hardness. One such aluminosilicate which is useful in the compositions of the invention is an amorphous waterinsoluble hydrated compound of the formula $Na_x(_xAlO_2.ySiO_2)$, wherein x is an integer of from 1 to 1.2 and y is 1, said amorphous material being further characterized by a $Mg^{++}$ exchange capacity of from about 50 mg eq. $CaCO_3$/g to about 150 mg eq. $CaCO_3$/g. This ion exchange builder is more fully described in Ireland published patent application 1505/74 to B. H. Gedge et al filed July 16, 1974, herein incorporated by reference.

A second water-insoluble synthetic aluminosilicate ion exchange material useful herein has the formula $Na_z[(AlO_2)_z.(SiO_2)_y]xH_2O$, wherein z and y are integers of at least 6; the molar ratio of z to y is in the range from 1.0 to about 0.5, and x is an integer from about 15 to about 264; said aluminosilicate ion exchange material having a particle size diameter from about 0.1 micron to about 100 microns; a calcium ion exchange capacity of at least about 200 mg eq./g; and a calcium ion exchange rate of at least about 2 grains/gallon/minute/gram. These synthetic aluminosilicates are discussed in Belgium Pat. No. 814,874 herein incorporated by reference.

The compositions of the present invention as either a detergent additive or a complete detergent product may be formulated into liquid compositions. The solvent or medium for the liquid composition may be a material such as water or a mono- or polyhydric alcohol of from 1 to 8 carbon atoms. The medium may comprise from about 10% to about 90%, preferably from about 20% to about 70% by weight of the total composition. Preferred liquid mediums are water, ethanol, glycerine, and ethylene glycol.

COMPOSITION PREPARATION

The detergent additive of the complete detergent product of the present invention may be formulated as a liquid paste or solid composition.

When prepared as a liquid the compositions of the present invention are slurried in the solvent medium and packaged. To prevent the settling out of the less soluble materials, electrolytes such as potassium chloride or other known suspending agents, may be added to the composition in minor amounts. To prepare the paste form of the present invention an the amount of solvent medium is employed is such that the product becomes extremely viscous.

When the additive or complete detergent product of the present invention is formulated as a solid, the product may be in the form of homogenous granule or may be present as separately admixed granules. To prepare the additive or complete detergent composition in the form of homogenous granules the product is slurried and then formed into granules by spray drying, drum drying, freeze drying, or agglomeration. Of the methods of homogenous granule formation, spray drying is preferred as the granules have greater uniformity of size.

Spray drying of the additive or detergent compositions of the present invention is best carried out as set forth in U.S. Pat. Nos. 3,629,951 and 3,629,955 to Davis et al, issued Dec. 28, 1971.

Where the detergent or the additive composition is formed by admixture, it is preferable to include a small amount of binding agent to prevent segregation of the ultrafine alkaline earth metal pyrophosphate crystallization seed from the remaining much larger granules of the composition. Suitable binding agents include for instance polyethylene glycol which may be sprayed onto the detergent or additive composition to prevent such segregation. Preferably the polyethylene glycol has a molecular weight ranging from about 400 to about 10,000.

The detergent additive or complete detergent composition of the present invention will most effectively be used at concentrations where the unique builder system of the present invention is present in amount sufficient to control substantially all of the calcium hardness present. Generally the compositions of the present invention will be used at from about 0.05% to about 0.5% by weight of the wash solution.

The additive aspect of the present invention may be used as a soak solution prior to washing the clothes for a period of from a few minutes to several hours. The additive composition may also be used to augment the consumer's regular detergent product. The detergent compositions of the present invention are otherwise used in the same manner as conventional detergent products presently being marketed.

Following are Examples of the present invention:

EXAMPLE I

Detergent additives are prepared in accordance with the invention having the following compositions:

A

| | |
|---|---|
| 97.5% | sodium pyrophosphate |
| 2.4% | dicalcium pyrophosphate (mean particle diameter 0.01μ) |
| 0.1% | minors |

B

| | |
|---|---|
| 11.0% | sodium pyrophosphate |
| 88.8% | dicalcium pyrophosphate (mean particle diameter 25μ) |
| 0.2% | minors |

Products A and B are tested at a concentration of 0.2% by weight for hardness control in 11 grain water by presoaking clay soiled dacron polyester swatches for 1 hour in 100°F. water followed by washing the fabrics with a detergent product (at 0.12% by weight) at the same temperature. The detergent product had the following composition:

| | |
|---|---|
| 20% | sodium alkyl (12 carbons benzene sulfonate) |
| 20% | sodium carbonate |
| 40% | sodium sulfate |
| 12% | moisture |
| 8% | minors |

Products A and B as used above show increased detergency as measured by a Hunter Whiteness meter over control swatches which are treated with the detergent alone.

EXAMPLE II

Detergent products A, B and C are prepared by spray drying.

| | A | B | C |
|---|---|---|---|
| Sodium alkyl (12 carbons) benzene sulfonate | 5% | 22% | — |
| Sodium coconut triethoxy sulfate | — | 5% | 15% |
| Sodium pyrophosphate | 30% | 34% | 60% |
| Sodium sulfate | 50% | 14% | — |
| Dicalcium pyrophosphate (mean particle diameter 3μ) | 10% | 15% | 20% |
| Minors | 5% | 10% | 5% |

Compositions A, B, C are tested for cleaning and hardness control compared to the detergent described in Example I. A, B, and C perform better under the conditions of Example I than does the detergent product disclosed therein.

A, B, C may be modified to form liquid compositions by adding the dried product to water so that the water makes up 70% of the total product.

What is claimed is:

1. A detergent additive comprising:
    a. an alkali metal pyrophosphate; and
    b. an alkaline earth metal pyrophosphate having a mean particle diameter of less than 25 microns; in a weight ratio of the alkali metal pyrophosphate to the alkaline earth metal pyrophosphate of from about 60:1 to about 1:8.

2. The composition of claim 1 additionally comprising a supplemental alkaline material at from about 1% to about 30% by weight selected from the group consisting of alkali metal carbonates, and alkali metal and alkaline earth metal hydroxides and mixtures thereof.

3. The composition of claim 1 wherein the alkaline earth metal pyrophosphate is calcium or magnesium pyrophosphate.

4. The composition of claim 3 wherein the mean particle diameter of the alkaline earth metal pyrophosphate is from about 0.01 to about 1 micron.

5. The composition of claim 4 wherein the weight ratio of the alkali metal pyrophosphate to the alkaline earth metal pyrophosphate is from about 20:1 to about 1:1.

6. The composition of claim 5 wherein the alkaline earth metal pyrophosphate is the calcium salt.

7. The composition of claim 6 wherein the alkali metal pyrophosphate is the sodium salt.

8. The composition of claim 2 wherein the supplemental alkaline material is sodium carbonate.

9. A detergent composition comprising:
    a. from about 5% to about 60% by weight of an alkali metal pyrophosphate;
    b. from about 1% to about 50% by weight of an alkaline earth metal pyrophosphate having a mean particle diameter of less than 25 microns and
    c. from about 2% to about 40% by weight of an organic detergent surfactant component.

10. A detergent composition in accordance with claim 9 wherein the organic detergent is selected from the group consisting of anionic and nonionic detergents and mixtures thereof.

11. The detergent composition of claim 10 wherein the mean particle diameter of the alkaline earth metal pyrophosphate is from about 0.01 to about 1 micron.

12. The detergent composition of claim 11 wherein the weight ratio of the alkali metal pyrophosphate to the alkaline earth metal pyrophosphate is from about 20:1 to about 1:1.

13. The detergent composition of claim 12 wherein the alkali metal pyrophosphate and the alkaline earth metal pyrophosphate are sodium pyrophosphate and calcium pyrophosphate.

14. The detergent composition of claim 13 wherein the sodium pyrophosphate is present at from about 8% to about 40%, the calcium pyrophosphate is present at from about 2% to about 30%, and the detergent is present at from about 5% to about 30% by weight.

15. The detergent composition of claim 14 wherein the detergent component is a nonionic selected from the group consisting of alkoxylated alcohols and alkoxylated alkyl phenols having from 8 to 20 carbon atoms in the alkyl radical and from 1 to 30 alkoxy units per alkyl radical and mixtures thereof.

16. The detergent composition of claim 15 wherein the nonionic is an ethoxylated alcohol wherein the alcohol residue with from 10 to 16 carbon atoms and the degree of ethoxylation is from 1 to 10 moles of ethylene oxide per mole of alcohol residue.

17. The detergent composition of claim 14 wherein the detergent component is anionic.

18. The composition of claim 17 wherein the anionic detergent is selected from the group consisting of the alkali metal and ammonium salts of alkyl ether sulfates, alkyl benzene sulfonates, alkyl sulfates, and alpha-sulfocarboxylic acids.

19. The detergent composition of claim 9 additionally comprising a supplemental alkaline material at from about 1% to about 30% by weight selected from the group consisting of alkali metal carbonates, alkali metal, and alkaline earth metal hydroxides and mixtures thereof.

* * * * *